(12) United States Patent
Li et al.

(10) Patent No.: US 8,879,865 B2
(45) Date of Patent: Nov. 4, 2014

(54) PANCHROMATIC SHARPENING METHOD OF SPECTRAL IMAGE BASED ON FUSION OF OVERALL STRUCTURAL INFORMATION AND SPATIAL DETAIL INFORMATION

(71) Applicants: Bo Li, Beijing (CN); Qizhi Xu, Beijing (CN); Yue Tian, Beijing (CN); Feng Gao, Beijing (CN); Chen Zhong, Beijing (CN)

(72) Inventors: Bo Li, Beijing (CN); Qizhi Xu, Beijing (CN); Yue Tian, Beijing (CN); Feng Gao, Beijing (CN); Chen Zhong, Beijing (CN)

( * ) Notice: Subject to any disclaimer, the term of this patent is extended or adjusted under 35 U.S.C. 154(b) by 0 days.

(21) Appl. No.: 14/082,948

(22) Filed: Nov. 18, 2013

(65) Prior Publication Data
US 2014/0301659 A1   Oct. 9, 2014

(30) Foreign Application Priority Data

Apr. 7, 2013   (CN) .......................... 2013 1 0118201

(51) Int. Cl.
*G06K 9/40* (2006.01)
*G06T 5/00* (2006.01)

(52) U.S. Cl.
CPC ..................................... *G06T 5/003* (2013.01)
USPC ....................................................... 382/263

(58) Field of Classification Search
CPC ................ G06T 2207/10036; G06T 5/003; G06T 2207/10041; G06T 5/50; G06T 2207/10024; G06T 2207/20192; G06T 2207/20221; G06T 2207/30088; G06T 2207/30181; G06T 7/0012; G06K 9/0063
See application file for complete search history.

(56) References Cited

U.S. PATENT DOCUMENTS 5,949,914 A * 9/1999 Yuen .............................. 382/254
6,097,835 A * 8/2000 Lindgren ....................... 382/162
(Continued)

FOREIGN PATENT DOCUMENTS

CN   1313972 C    5/2007
CN   102194221 A  9/2011

OTHER PUBLICATIONS

Dan Chen, Multi-Source Image Fusion Algorithm Based on PCA and Wavelet Transform, Journal of Chongqing University of Science and Technology,12th vol. 2nd issue, Apr. 30, 2010.

*Primary Examiner* — Jingge Wu
(74) *Attorney, Agent, or Firm* — Mark Clodfelter

(57) ABSTRACT

The present invention provides a panchromatic sharpening method of spectral image based on fusion of overall structural information and spatial detail information, comprising: performing brightness linear stretching on a panchromatic image, so as to set the variance of the panchromatic image to be equal to the variance of said spectral image; respectively interpolating N components of the spectral image so as to generate an interpolation image series having the same resolution as that of the panchromatic image; subtracting the interpolation image series from the panchromatic image after said linear stretching to obtain difference images; performing Gauss filtering on the difference images, thereby obtaining difference tendency images; and, respectively subtracting the difference tendency image series from the panchromatic image after said linear stretching, thus obtaining fused images. The method can maintain both spectral fidelity and texture detail fidelity of the fused images, support high computation speed, and has wide applicability.

8 Claims, 3 Drawing Sheets

(56) References Cited

U.S. PATENT DOCUMENTS

| | | |
|---|---|---|
| 2004/0141659 A1 | 7/2004 | Zhang |
| 2005/0100220 A1* | 5/2005 | Keaton et al. ............... 382/191 |
| 2008/0131024 A1* | 6/2008 | Riley et al. .................. 382/284 |
| 2008/0166062 A1* | 7/2008 | Adams et al. ............... 382/255 |
| 2010/0069758 A1* | 3/2010 | Barnes et al. ............... 600/473 |
| 2011/0235939 A1* | 9/2011 | Peterson et al. ............. 382/266 |
| 2012/0269430 A1* | 10/2012 | Deskevich et al. .......... 382/167 |
| 2013/0129201 A1* | 5/2013 | Liu et al. ..................... 382/160 |
| 2013/0137961 A1* | 5/2013 | Barnes et al. ............... 600/407 |
| 2014/0010472 A1* | 1/2014 | Xu ................................ 382/263 |

* cited by examiner

PANCHROMATIC SHARPENING METHOD OF SPECTRAL IMAGE BASED ON FUSION OF OVERALL STRUCTURAL INFORMATION AND SPATIAL DETAIL INFORMATION

CROSS REFERENCE TO RELATED APPLICATIONS

This application claims priority under 35 USC §119 from Chinese patent application no. 201310118201.7, filed Apr. 7, 2013, which is incorporated in its entirety by reference herein.

FIELD OF THE INVENTION

The present invention relates to an image fusion method for remote-sensing images, particularly to a panchromatic sharpening method based on fusion of overall structural information and spatial detail information. The method concerns digital image processing.

BACKGROUND ART OF THE INVENTION

With the development of satellite and remote-sensing techniques, countries around the world have been launching more and more sensor satellites, such as IKONOS, QuickBird, ZiYuan-3 and etc., which simultaneously acquired panchromatic and multispectral imagery. Since an imaging device makes a balance between spectral resolution and spatial resolution, the spatial resolution of panchromatic image is better than those of multispectral and hyperspectral images, while multispectral and hyperspectral images contain a plurality of spectral wave bands and their spectral resolutions are better than that of a panchromatic image. Thus, generation of fused image with sharpened spatial details and enriched spectral information, by sharpening multispectral and hyperspectral images with spatial detail information of panchromatic image, helps realizing better and more accurate extraction of needed information as well as fast and accurate analysis of images by image-interpreting personnel.

In the present application, multispectral images and hyperspectral images are collectively referred to as "spectral images". Typically, spectral imagery consists of more than one wave bands, so a spectral image contains a plurality of components, each of which is a grey scale image. In practical use, a panchromatic and spectral image fusion method must satisfy the requirements of: spectral fidelity that the spectral information of the fused images needs to be kept consistent with the spectral information of the spectral image; detail fidelity that the information on spatial details needs to be kept consistent with that of the panchromatic image; and, high timeliness that the computation complexity of the fusion method needs to be low so as to realize fusion of panchromatic and spectral images of large sizes and big data amounts at high speed.

To date, lots of image fusion methods have been proposed in the art, such as fusion methods based on component-replacement, fusion methods based on IHS transform, PCA transform, Gram-Schmidt (GS) transform and so on, and fusion methods based on frequency decomposition including wavelet transform, curvelet transform etc. Generally, fusion methods based on component-replacement have good spatial detail fidelity, but the spectrum of their fused images has severe distortion in areas where great difference in luminance exists between panchromatic image and the replaced components. Fusion methods based on frequency decomposition have better spectral fidelity, but they have the defect of detail distortion. In addition, the above-mentioned fusion methods require complicated computation, and their computations for fusion process of large-size panchromatic and spectral images are extremely time-consuming. For example, with each of the two methods of the best application results so far, the fusion method based on GS transform provided by ENVI (The Environment for Visualizing Images) remote-sensing image processing software (abbreviated as ENVI-GS transform method) and panchromatic sharpening method provided by PCI (PCI Geomatica) remote-sensing image processing software (abbreviated as PCI sharpening method), the time for fusion computation is greater than 150 seconds for a panchromatic image of 12,000×12,000 pixels and a multispectral image of 3,000×3,000 pixels with a computer with a 3.2 GHz 4-core CPU, 2 GB of memory and Windows XP operating system, which can hardly satisfy the needs for high-efficiency.

In such a context, it is of great significance to develop a panchromatic sharpening fusion method capable of effectively avoiding spectral and spatial detail distortions of fused images and having low computation complexity, for fast and efficient generation of panchromatic and spectral fused image with high resolution.

SUMMARY OF THE INVENTION

According to an aspect of the invention, there is provided a panchromatic sharpening method of spectral image based on fusion of overall structural information and spatial detail information. In this application, "spectral image" refers to a multispectral or hyperspectral image. Usually, a spectral image contains a plurality of spectral bands, so a spectral image contains a plurality of components, each being a grey scale image. For example, a multispectral image of QuickBird or IKONOS satellite contains four components, and a hyperspectral image contains tens or even hundreds of components. In this application, the total number of components in a spectral image is labeled as N. The present invention realizes high fidelity fusion of panchromatic and spectral images merely by image subtraction and image smoothing filtering; moreover, the method of the invention features in fast computation speed and good applicability.

In one aspect, the present invention provides a panchromatic sharpening method of spectral image based on fusion of overall structural information and spatial detail information, including the steps of:

A) performing brightness linear stretching on a panchromatic image, so as to set the variance $s_P$ of the panchromatic image to be equal to the variance $s_S$ of said spectral image;

B) interpolating N components of the spectral image respectively to generate interpolation images $I_1, I_2, K, I_N$ having the same resolution as that of the panchromatic image;

C) subtracting the interpolation images $I_1, I_2, K, I_N$ from the panchromatic image after said linear stretching, thereby obtaining difference images $D_1, D_2, K, D_N$;

D) performing Gauss filtering on the difference images $D_1, D_2, K, D_N$, thereby obtaining difference tendency images $S_1, S_2, K, S_N$; and E) respectively subtracting the difference tendency images $S_1, S_2, K, S_N$ from the panchromatic image after said linear stretching, thus obtaining fused images $U_1, U_2, K, U_N$.

In a further aspect, in the above step A), the pixel values of the panchromatic image is multiplied by $\sqrt{s_S/s_P}$ to perform the brightness linear stretching.

In a still further aspect, in the above step A), a predetermined number of pixels are randomly selected for evaluating the variance of the spectral image and that of the panchromatic image.

In a still further aspect, in the above step B), bilinear interpolation is used to perform image interpolation.

In a still further aspect, in the above step D), row-by-row smoothing filtering is performed on the difference images using one-dimensional Gauss filter G, and then column-by-column smoothing filtering is performed on the difference images using the transpose $G^T$ of the one-dimensional Gauss filter G.

In a still further aspect, in the above step D), the one-dimensional Gauss filter G has a length of 13, and the scale parameter of G is 3.33.

The a panchromatic sharpening method of spectral image based on fusion of overall structural information and spatial detail information provided by the invention has the advantages including:

- it achieves spectral and spatial detail fidelities and has good applicability;
- it is simple and only involves image subtraction and image smoothing operations, and has high computation speed; and
- it is not subjected to limitation of the number of bands of the spectral image, and it can realize fusion by selecting any number of bands as required by application.

BRIEF DESCRIPTION OF THE DRAWINGS

FIGS. 2(a) to 2(e) show experimental results of fusion method according to an embodiment of the present invention in comparison to some typical prior art methods with respect to QuickBird image, in which FIG. 2(a) shows a panchromatic image, FIG. 2(b) shows a multispectral image, FIG. 2(c) shows result of ENVI-GS transform method, FIG. 2(d) shows result of PCI sharpening method, and FIG. 2(e) shows result of method according to an embodiment of the present invention.

FIGS. 3(a)-3(e) show experimental results of fusion method according to an embodiment of the present invention in comparison to some typical methods of the prior art, with respect to IKONOS image, in which FIG. 3(a) is a panchromatic image, FIG. 3(b) is a multispectral image, FIG. 3(c) shows result of ENVI-GS transform method, FIG. 3(d) shows result for PCI sharpening method, and FIG. 3(e) shows result of method according to an embodiment of the present invention.

DETAILED DESCRIPTION OF THE INVENTION

Detailed description of the invention is made below with respect to embodiments and drawings.

According to an embodiment of the invention, image data is divided into an overall structure part and a spatial detail part; information of the overall structure part mainly reflects the overall tendency of the image data, and its content is relatively vague; information of the spatial detail part has relatively violent variation and mainly depicts edges and textures of the image, reflecting extent of clarity of local details of the image. Spectral image has relatively low spatial resolution, but it reflects spectral reflectivity of objects on the ground, so it can be used to analyze the material attributes of the objects on the ground. Therefore, fusion of panchromatic and spectral images can only be performed by extracting information of spatial details from a panchromatic image to sharpen the spectral image; otherwise, if overall structure information of the panchromatic image is introduced, the spectral attributes of spectral image would be altered, leading to spectral distortion. In other words, if overall structure information of the fused images is the same as the overall structure information of the spectral interpolation image, spectral fidelity of the fused images will be good. Meanwhile, information on spatial details introduced into the spectral image must be kept consistent with the information on spatial details of the panchromatic image; otherwise, texture details of the fused images would be vague, which affects sharpening effect.

Figure 1:
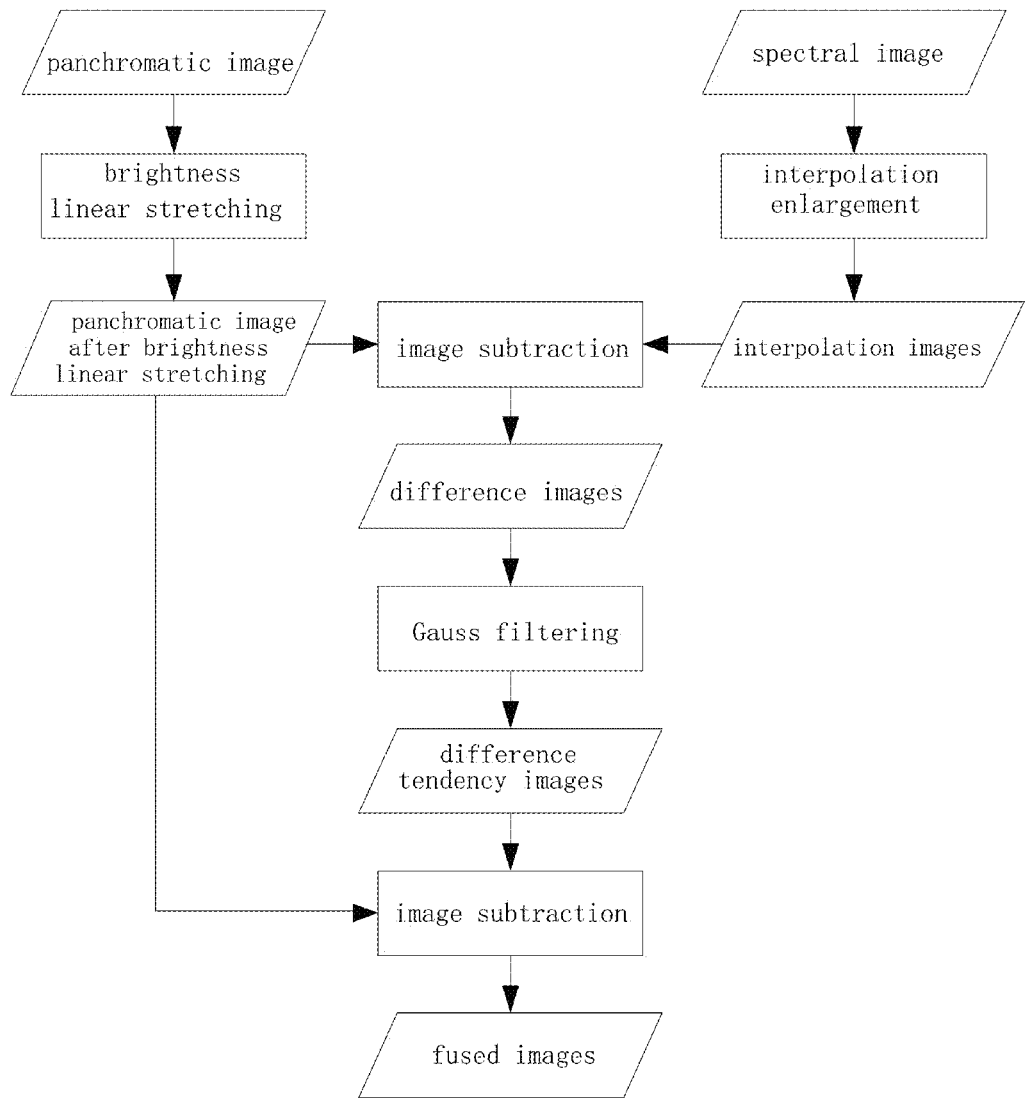
FIG. 1 is a flow diagram showing a fusion method according to an embodiment of the present invention.

According to an embodiment of the invention, information on overall structure of panchromatic image is respectively fused with N components of spectral interpolation image, and the difference between the information on overall structure of the panchromatic image and the information on overall structure of the spectral interpolation image is set to zero at every pixel by fusion, thereby realizing fidelity of spectral and spatial details. FIG. 1 illustrates a flowchart of a method according to an embodiment of the invention, which includes:

first, performing brightness linear stretching on the panchromatic image; interpolating the spectral image to the resolution which is the same as that of the panchromatic image, to obtain a spectral interpolation image; respectively subtracting the N components of the spectral interpolation image from the panchromatic image, thereby obtaining N difference images; then, respectively performing Gauss filtering on the N difference images, thereby obtaining N difference tendency images; subtracting the N difference tendency images from the panchromatic image, thereby obtaining the fused images.

Method for panchromatic sharpening of spectral image based on fusion of overall structure information and spatial detail information provided by the invention is described in more detail below as:

(1) brightness linear stretching is performed on a panchromatic image to set the variance $s_P$ of the panchromatic image to be equal to the variance $s_S$ of a corresponding spectral image;

First, variance of the spectral image and that of the panchromatic image are calculated. To raise the variance computational speed, in an embodiment, a number of pixels are randomly chosen for evaluating the variances of the spectral image and the panchromatic image, so as to reduce the time spent on variance computation. Then, linear brightness stretching is performed by multiplying the values of the pixels of the panchromatic image by $\sqrt{s_S/s_P}$.

(2) respectively interpolating N components of the spectral image into interpolation images $I_1, I_2, K, I_N$ having the same resolution as the panchromatic image;

In the instant invention, spectral image refers to multispectral image and hyperspectral image. Usually, a spectral image contains a plurality of (N) spectral bands, so a spectral image contains a plurality of components, each of which is a grey scale image. For example, a multispectral image from QuickBird or IKONOS satellite contains four components. A hyperspectral image contains tens or even hundreds of components. Since the resolution of a spectral image is lower than that of a panchromatic image, a spectral image needs to be interpolated to the same resolution as that of a corresponding panchromatic image upon image fusion.

As a way of implementing image interpolation, multispectral image is interpolated using bilinear interpolation. Assuming that pixel I(i+u,j+v) is an interpolation point among pixels (I(i,j), I(i+1,j), I(i,j+1), I(i+1,j+1)), with 0<u<1 and 0<v<1, where i being the row index of image, j being the column index of image, the computation method of the interpolation is:

$$I(i+u,j+v)=(1-u)(1-v)I(i,j)+uvI(i+1,j+1)+v(1-u)I(i,j+1)+u(1-v)I(i+1,j)$$

(3) respectively subtracting said interpolation images $I_1$, $I_2$, K, $I_N$ from the panchromatic image after said linear stretching, thereby obtaining difference images $D_1$, $D_2$, K, $D_N$;

In this step, it is sufficient to subtract $I_i$ (i=1, 2, K, N) respectively from the panchromatic image. The difference images obtained from the subtraction contain two parts of information: one part is information on spatial details of the panchromatic image, and the other part is the difference between the information on overall structure of the spectral image and the information on overall structure of the panchromatic image.

(4) performing Gauss filtering on the difference images $D_1$, $D_2$, K, $D_N$, thereby obtaining difference tendency images $S_1$, $S_2$, K, $S_N$;

Performing Gauss filtering on the difference images is to filter information on spatial details of the panchromatic image in the difference images, so as to obtain differences between the information on overall structure of the panchromatic image and the information on overall structure of the spectral image. According to an embodiment, to perform Gauss filtering at high speed, first, one-dimensional Gauss filter G is used to perform row-by-row smoothing filtering on the image, and then column-by-column smoothing filtering is performed on the difference images using the transpose GT of the one-dimensional Gauss filter G. Preferably, the one-dimensional Gauss filter G has a length of 13 while the scale parameter of G is 3.33.

(5) respectively subtracting the difference tendency images $S_1$, $S_2$, K, $S_N$ from the panchromatic image after said linear stretching, thus obtaining fused images $U_1$, $U_2$, K, $U_N$.

In this step, it is appropriate to respectively subtract $S_i$ (i=1, 2, K, N) from the panchromatic image. Fused images is obtained by subtracting $S_1$, $S_2$, K, $S_N$ from the panchromatic image; since $S_1$, $S_2$, K, $S_N$ are differences between the information on overall structure of the panchromatic image and the information on overall structure of the spectral image, the spatial detail information of the fused images is the same as that of the panchromatic image, while the overall information of the fused images is the same as that of the spectral image; that is, the spectral information of the fused images is kept consistent to that of the spectral image.

Experiments were conducted to compare the method of the present invention with the best fusion method of the current main-stream remote-sensing processing software, that is, GS transform fusion method of ENVI software (abbreviated as "ENVI-GS transform method") and panchromatic sharpening method provided by PCI software (abbreviated as "PCI sharpening method"). The experimental data was the panchromatic and multispectral images of a total of 21 scenes taken by QuickBird and IKONOS satellites and etc., in which each of the panchromatic images had an average size of about 12,000×12,000 pixels while each of the multispectral image had a size of about 3,000×3,000 pixels.

Figure 2:
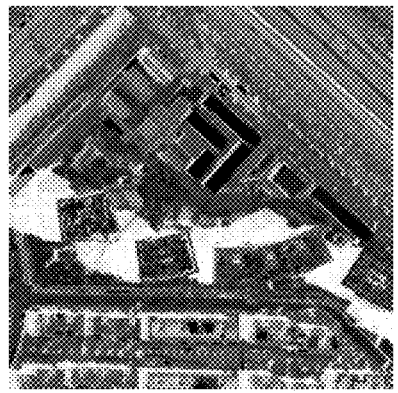
Figure 2:
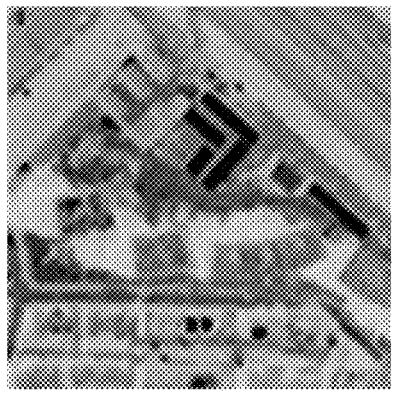
Figure 2:
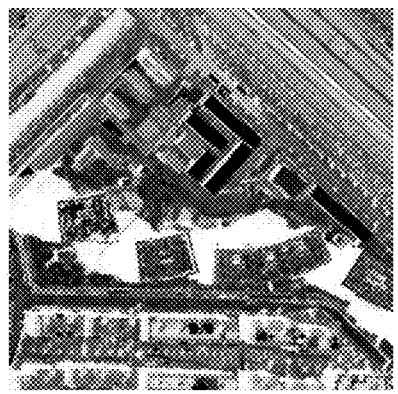
Figure 2:
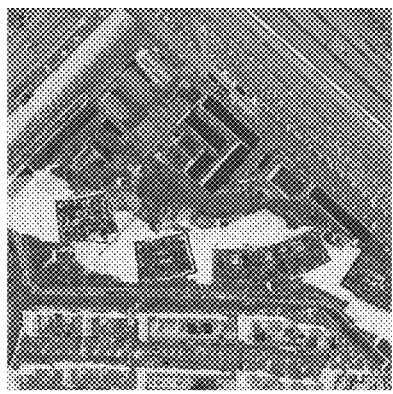
Figure 2:
Figure 3:
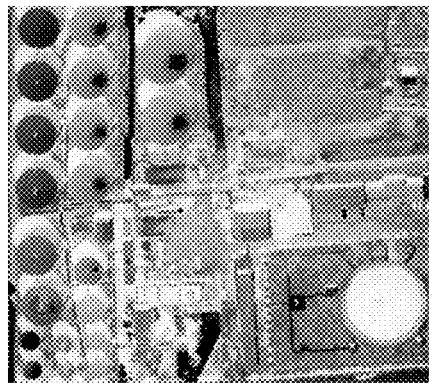
Figure 3:
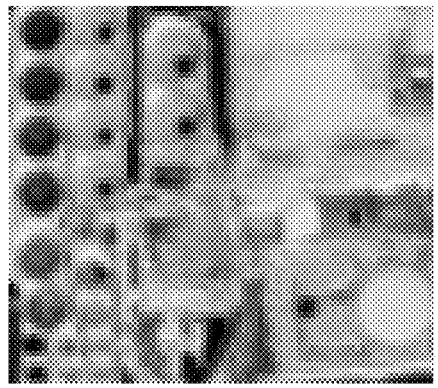
Figure 3:
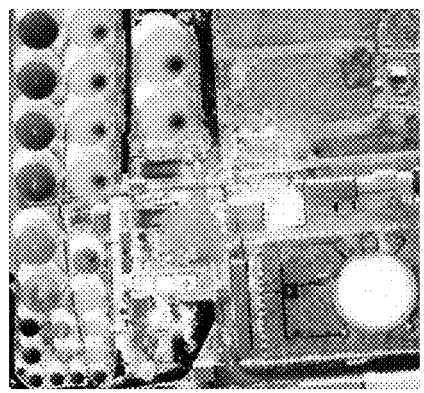
Figure 3:
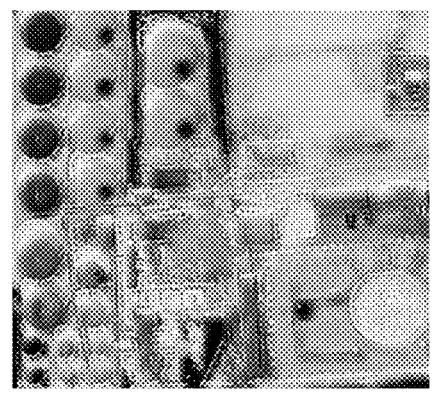
Figure 3:
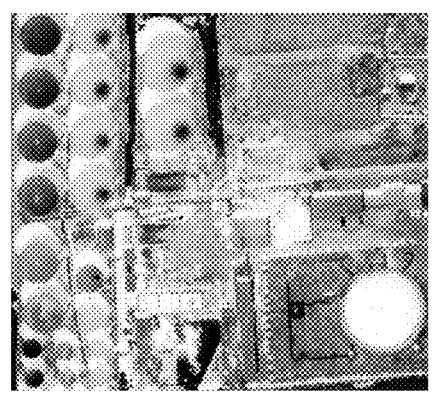

FIGS. 2 and 3 respectively show panchromatic and multi-spectral images of QuickBird and IKONOS satellites and fused images. As experimental images are large, only parts of the experimental images are shown in FIGS. 2 and 3 in order to display objects on the ground in these images (since fused images cannot be shown here using pseudo color images, in FIGS. 2 and 3 fused images of pseudo colors are converted to grey scale images to indicate the fusion effects.) With respect to subjective viewing effects, the method of the invention had good fidelity on spectral and spatial details for all experimental data, as seen from FIGS. 2(e) and 3(e). However, the prior art methods, taken as comparison, all led to distortion: for ENVI-GS transform method, spectrum of fused images suffered severe distortion in some areas, as can be seen in FIGS. 2(c) and 3(c); for PCI sharpening method, spectrum of fused image distorted, as can be seen from FIG. 2(d).

Spectral fidelity of fused image is evaluated below using spectral distortion, spectral angle and global relative error, while spatial detail fidelity is evaluated using detail distortion. The smaller the values of these indexes, the better fidelity of the fused images is. These indexes are defined as follows:

(1) Spectral Distortion (SD)

Spectral Distortion indicates extent of spectral distortion of fused image $[F_{i,j,k}]_{m'n'p}$ and of multispectral image $[M_{i,j,k}]_{m'n'p}$, where m and n are height and width of the subject image respectively, p is the number of bands of the image, i and j are row and column indexes of the image respectively, k is the index of band of the image, G is Gauss filter. The smaller the value of SD is, the smaller the spectral distortion of the fused image is. Its computation formula is:

$$SD = \frac{1}{m'n'p} \sum_{k=1}^{p} \sum_{i=1}^{m} \sum_{j=1}^{n} |(F^*G)_{i,j,k} - M_{i,j,k}|$$

(2) Detail Distortion (DD)

Detail Distortion is the average of difference between spatial detail information of the fused image $[F_{i,j,k}]_{m'n'p}$ and that of the panchromatic image $[P_{i,j}]_{m'n'}$, where m and n are height and width of the subject image respectively, p is the number of bands of the image, i and j are row and column indexes of the image respectively, k is the index of band of the image, G is Gauss filter. The smaller the value of Detail Distortion is, the better the detail fidelity of the fused image is. Its computation formula is:

$$DD = \frac{1}{m'n'p} \sum_{k=1}^{p} \sum_{i=1}^{m} \sum_{j=1}^{n} |(F - F^*G)_{i,j,k} - (P - P^*G)_{i,j}|$$

Table 1 lists results of objective evaluation of the method of the invention and the comparative methods. It can be seen from the objective indexes in Table 1 that both spectral distortion and detail distortion of the method of the invention are smaller than those of the comparative methods, indicating that the spectral and spatial detail fidelities of the method of the invention are superior to those of the comparative methods. In a computer with a 3.2 GHz 4-core CPU, 2 GB of memory and Windows XP operating system, ENVI-GS transform method spent an average of 160.52 seconds to fuse a panchromatic image (12,000×12,000 pixels) and spectral image (3,000×3,000 pixels), PCI sharpening method spent an average of 140.93 seconds, while the method of the invention spent 25.35 seconds. The experimental results show that the method of the invention led to better spectral fidelity and detail fidelity and faster computation speed than the comparative methods.

TABLE 1

| Objective Evaluation of Quality of Fused Images | | |
| --- | --- | --- |
| | Spectral distortion | Detail distortion |
| ENVI-GS Transform | 27.22 | 5.53 |
| PCI Sharpening | 9.10 | 6.06 |
| Method of the Invention | 5.34 | 4.82 |

While the panchromatic sharpening method of spectral image based on fusion of overall structural information and spatial detail information according to the invention is proposed with respect to improvement of fidelity and computation speed of fusion of panchromatic and spectral images, it is obvious that the fusion method depicted in this description is also applicable to fusion operation of images taken by ordinary imaging devices, such as digital camera, with equally beneficial results.

While a detailed description of the panchromatic sharpening method of spectral image based on fusion of overall structural information and spatial detail information according to the invention has been given above, the scope of the invention is not limited thereto. All variations of the above-described embodiments are within the scope of the present invention as defined by the appended claims.

The invention claimed is:

1. A panchromatic sharpening method of spectral image based on fusion of overall structural information and spatial detail information, comprising:
    A) performing brightness linear stretching on a panchromatic image, so as to set the variance $s_P$ of the panchromatic image to be equal to the variance $s_S$ of a corresponding spectral image;
    B) respectively interpolating N components of the spectral image, thereby generating interpolation images $I_1, I_2, K, I_N$ having the same resolution as that of the panchromatic image;
    C) subtracting the interpolation images $I_1, I_2, K, I_N$ from the panchromatic image after said linear stretching, thereby obtaining difference images $D_1, D_2, K, D_N$;
    D) performing Gauss filtering on the difference images $D_1, D_2, K, D_N$, thereby obtaining difference tendency images $S_1, S_2, K, S_N$; and
    E) respectively subtracting the difference tendency images $S_1, S_2, K, S_N$ from the panchromatic image after said linear stretching, thus obtaining fused images $U_1, U_2, K, U_N$.

2. The method as defined in claim 1, wherein said brightness linear stretching in said step A) is performed by multiplying the pixel values of the panchromatic image by $\sqrt{s_S/s_P}$.

3. The method as defined in claim 2, wherein in said step A) a predetermined number of pixels are randomly selected from the spectral image and the panchromatic image for evaluating the variance of the spectral image and that of the panchromatic image.

4. The method as defined in claim 1, wherein in said step B) bilinear interpolation is used to interpolate the N components of the spectral image.

5. The method as defined in claim 1, wherein in said step D) row-by-row smoothing filtering is performed on the difference images using one-dimensional Gauss filter G, and then column-by-column smoothing filtering is performed on the difference images using the transpose $G^T$ of the one-dimensional Gauss filter G.

6. The method as defined in claim 5, wherein said one-dimensional Gauss filter G has a length of 13, and the scale parameter of G is 3.33.

7. The method as defined in claim 1, wherein said spectral image is a multispectral image.

8. The method as defined in claim 1, wherein said spectral image is a hyperspectral image.

\* \* \* \* \*